(12) United States Patent
Gernhardt et al.

(10) Patent No.: US 11,736,438 B2
(45) Date of Patent: *Aug. 22, 2023

(54) SECURE MESSAGE EXCHANGE BETWEEN DEPLOYMENTS

(71) Applicant: Snowflake Inc., Bozeman, MT (US)

(72) Inventors: Robert Bengt Benedikt Gernhardt, Seattle, WA (US); Mikhail Kazhamiaka, Bellevue, WA (US); Nithin Mahesh, Redmond, WA (US); Eric Robinson, Sammamish, WA (US)

(73) Assignee: Snowflake Inc., Bozeman, MT (US)

( * ) Notice: Subject to any disclaimer, the term of this patent is extended or adjusted under 35 U.S.C. 154(b) by 21 days.

This patent is subject to a terminal disclaimer.

(21) Appl. No.: 17/156,072

(22) Filed: Jan. 22, 2021

(65) Prior Publication Data

US 2021/0281544 A1    Sep. 9, 2021

Related U.S. Application Data

(63) Continuation of application No. 16/809,209, filed on Mar. 4, 2020, now Pat. No. 10,938,780.

(51) Int. Cl.
*H04L 29/06* (2006.01)
*H04L 9/40* (2022.01)

(52) U.S. Cl.
CPC ...... *H04L 63/0218* (2013.01); *H04L 63/0236* (2013.01); *H04L 63/0245* (2013.01)

(58) Field of Classification Search
CPC ............. H04L 63/0263; H04L 63/0227; H04L 63/029; H04L 63/02; H04L 63/0209; H04L 63/0218; H04L 63/0236; H04L 63/0245

USPC .......................................................... 726/11
See application file for complete search history.

(56) References Cited

U.S. PATENT DOCUMENTS

| | | | |
|---|---|---|---|
| 9,413,783 B1 | 8/2016 | Keogh | |
| 9,639,338 B2 | 5/2017 | Ruehl et al. | |
| 9,774,495 B1 | 9/2017 | Okita et al. | |
| 10,657,004 B1 | 5/2020 | Dalmia et al. | |
| 10,862,873 B1* | 12/2020 | Carru | H04L 9/3073 |
| 10,938,780 B1* | 3/2021 | Gernhardt | H04L 63/0236 |
| 2005/0015455 A1* | 1/2005 | Liu | H04L 51/212 |
| | | | 709/204 |
| 2005/0015626 A1 | 1/2005 | Chasin | |
| 2006/0277264 A1 | 12/2006 | Rainisto | |

(Continued)

OTHER PUBLICATIONS

"U.S. Appl. No. 16/809,209, Examiner Interview Summary dated Oct. 30, 2020", 2 pgs.

(Continued)

*Primary Examiner* — Sanchit K Sarker
(74) *Attorney, Agent, or Firm* — Schwegman Lundberg & Woessner, P.A.

(57) ABSTRACT

Different database deployments, or other data system deployments, may want to communicate with each other without sacrificing security or control. To this end, embodiments of the present disclosure may provide secure message exchange techniques for a source and/or target deployment. Configurable rule sets may be stored in the deployments; the rule sets may define what messages may be communicated between deployments. The deployments may implement a selective filtering scheme in one or more stages based on the rule sets to filter outgoing and/or incoming messages.

19 Claims, 9 Drawing Sheets

(56) References Cited

U.S. PATENT DOCUMENTS

| | | |
|---|---|---|
| 2011/0246584 A1 | 10/2011 | Vitaldevara et al. |
| 2011/0270886 A1 | 11/2011 | An et al. |
| 2012/0084423 A1 | 4/2012 | Mcgleenon |
| 2012/0278425 A1 | 11/2012 | Maxted |
| 2014/0006522 A1* | 1/2014 | Syrowitz .............. H04L 51/212 709/206 |
| 2014/0244585 A1 | 8/2014 | Sivasubramanian et al. |
| 2014/0317716 A1* | 10/2014 | Chao ...................... H04L 63/10 726/9 |
| 2015/0135253 A1 | 5/2015 | Angel et al. |
| 2015/0324182 A1* | 11/2015 | Barros ................... G06F 9/455 717/174 |
| 2016/0105408 A1* | 4/2016 | Cooper ................ H04L 45/745 726/3 |
| 2018/0024964 A1* | 1/2018 | Mao ..................... G06F 9/5016 711/173 |
| 2018/0041470 A1 | 2/2018 | Schultz et al. |
| 2018/0278675 A1* | 9/2018 | Thayer ................ H04L 41/0806 |
| 2019/0286832 A1 | 9/2019 | Szeto et al. |

OTHER PUBLICATIONS

"U.S. Appl. No. 16/809,209, Non Final Office Action dated Jul. 30, 2020", 16 pgs.

"U.S. Appl. No. 16/809,209, Notice of Allowance dated Nov. 30, 2020", 14 pgs.

"U.S. Appl. No. 16/809,209, Response filed Oct. 28, 2020 to Non Final Office Action dated Jul. 30, 2020", 11 pgs.

"Types of cloud computing private public and hybrid clouds", University of Chicago, <https://web.archive.org/web/20180324062300/https://cloud.illinois.edu/types-of-cloud-computing-private-public-and-hybrid-clouds>, (Mar. 24, 2018).

"What's the Difference between Public Private, Hybrid, and Community Clouds", AbacusNextBlog,, <https://www.abacusnext.com/blog/whats-difference-between-public-private-hybrid-and-community-clouds/>, (Jan. 5, 2017).

Mell, et al., "The NIST definition of Cloud Computing: Recommendations of the National Institute of Standards and Technology", Special Publication 800-145, (Sep. 2011), 1-7.

Sen, Jaydip, "Security and Privacy Issues in Cloud Computing", arxiv.org, <https://arxiv.org/ftp/arxiv/papers/1303/1303.4814.pdf>, (Sep. 2013).

\* cited by examiner

SECURE MESSAGE EXCHANGE BETWEEN DEPLOYMENTS

CROSS-REFERENCE TO RELATED APPLICATION

This application is a Continuation of U.S. patent application Ser. No. 16/809,209, filed Mar. 4, 2020, the contents of which are incorporated herein in their entirety.

TECHNICAL FIELD

The present disclosure generally relates to secure message exchange between different data system deployments.

BACKGROUND

Database systems, and other data systems, may be implemented in different configurations and arrangements. For example, cloud database systems may be provided through a cloud platform, which allows organizations and users to store, manage, and retrieve data from the cloud. Cloud database systems may be implemented as a public deployment, where multiple accounts can share processing resources and/or storage. Cloud database systems may also be implemented as a private deployment, where processing resources and/or storage are dedicated and isolated. Private deployments are typically separated from other deployments, which adds security and privacy benefits as well as providing improved speed.

Different deployments may need to communicate with each other to perform various tasks, such as replicating data. For example, a company may utilize private and public deployments, and the company may wish to exchange data between the different deployments. Conventional messaging techniques are limited in that they either allow or disallow all communication between different deployments, i.e., all-or-nothing communication. Therefore, using conventional messaging techniques between different deployments could expose sensitive data to unauthorized or unwanted access.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed above, different database deployments may want to communicate with each other without sacrificing security or control. To this end, embodiments of the present disclosure may provide secure message exchange techniques for a sending and/or receiving deployment. Configurable rule sets may be stored in the deployments; the rule sets may define what messages may be communicated between deployments. In some embodiments disclosed herein, the deployments may implement a selective filtering scheme in one or more stages based on the rule sets to filter outgoing and/or incoming messages. In other words, the selective filtering scheme may act as a series of gates to prevent unwanted leaking of information. Hence, the selective filtering scheme may provide appropriate security controls to protect private deployments from sending/receiving message traffic to/from other deployments, for example.

As disclosed herein, the selective filtering scheme may be implemented in a plurality of stages, going from coarse filtering to finer granularity. In some embodiments, the selective filtering scheme may begin by broadly filtering by message types, such as ping, test, replication request messages, etc. In a next stage, the messages may be filtered on characteristics of the message. In some embodiments, the messages may also be filtered on the contents of the messages in a subsequent stage.

The selective filtering scheme may facilitate different cross-deployment applications. In some embodiments, the selective filtering scheme may permit data replication between private and public deployments while still providing security safeguards to protect sensitive information. For example, using the selective filtering scheme, replication messages may be allowed between a private and a public deployment but only for a list of specified accounts, thus preventing access by non-authorized users.

Figure 1:
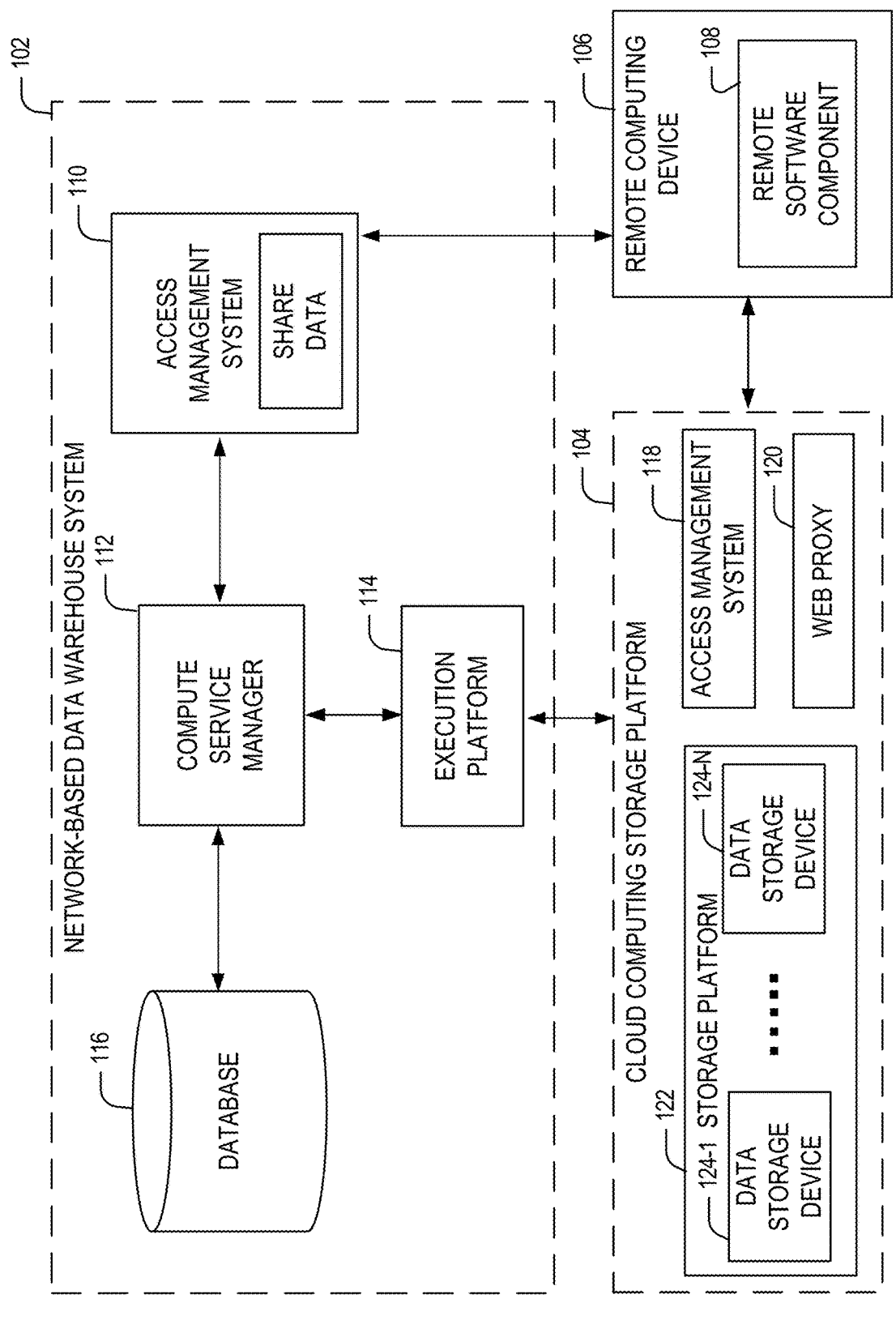
FIG. 1 illustrates an example computing environment in which a network-based data warehouse system can implement streams on shared database objects, according to some example embodiments.

FIG. 1 illustrates an example shared data processing platform 100 implementing secure messaging between deployments, in accordance with some embodiments of the present disclosure. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based data warehouse system 102, a cloud computing storage platform 104 (e.g., a storage platform, an AWS® service, Microsoft Azure®, or Google Cloud Services®), and a remote computing device 106. The network-based data warehouse system 102 is a network-based system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based data warehouse system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based data warehouse system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views, as discussed in further detail below.

The network-based data warehouse system 102 comprises an access management system 110, a compute service manager 112, an execution platform 114, and a database 116. The access management system 110 enables administrative users to manage access to resources and services provided by the network-based data warehouse system 102. Administrative users can create and manage users, roles, and groups, and use permissions to allow or deny access to resources and services. The access management system 110 can store share data that securely manages shared access to the storage resources of the cloud computing storage platform 104 amongst different users of the network-based data warehouse system 102, as discussed in further detail below.

The compute service manager 112 coordinates and manages operations of the network-based data warehouse system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based data warehouse system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-$n$ that are part of a cloud computing storage platform 104. In some embodiments, data storage devices 124-1 to 124-$n$ are cloud-based storage devices located in one or more geographic locations. For example, data storage devices 124-1 to 124-$n$ may be part of a public cloud infrastructure or a private cloud infrastructure. Data storage devices 124-1 to 124-$n$ may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based data warehouse system 102 and the access management system 118 of the cloud computing storage platform 104 can communicate and share information so as to enable access and management of resources and services shared by users of both the network-based data warehouse system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based data warehouse system 102 based on the changing data storage/retrieval needs as well as the changing needs of the users and systems accessing the shared data processing platform 100. The support of dynamic changes allows network-based data warehouse system 102 to scale quickly in response to changing demands on the systems and components within network-based data warehouse system 102. The decoupling of the computing resources from the data storage devices 124-1 to 124-n supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based data warehouse system 102 is dynamic and supports regular changes to meet the current data processing needs.

During typical operation, the network-based data warehouse system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-n in the cloud computing storage platform 104. Thus, the computing resources and cache resources are not restricted to specific data storage devices 124-1 to 124-n. Instead, all computing resources and all cache resources may retrieve data from, and store data to, any of the data storage resources in the cloud computing storage platform 104.

Figure 2:
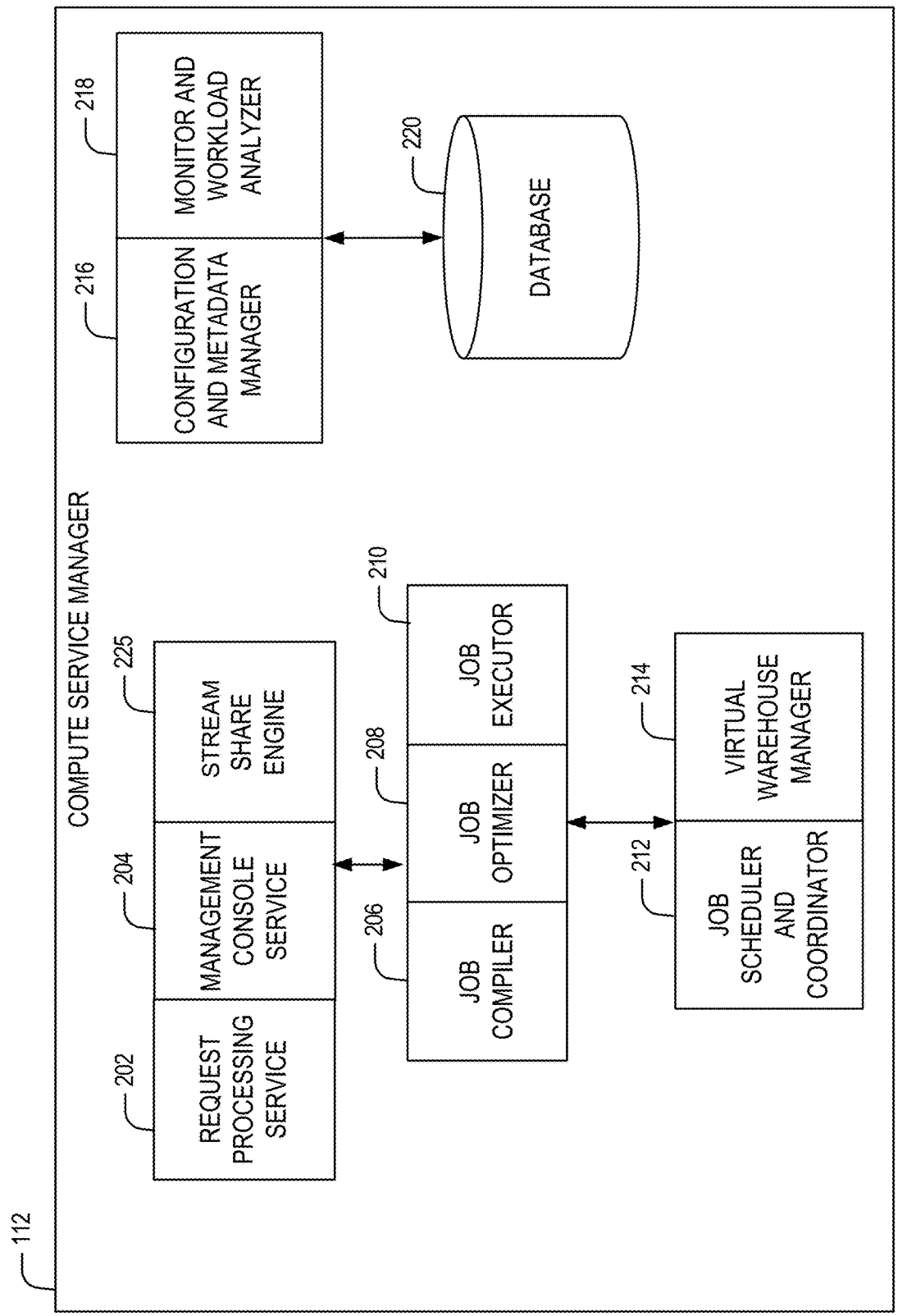
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The stream share engine 225 manages change tracking on database objects, such as a data share (e.g., shared table) or shared view, according to some example embodiments, and as discussed in further detail below.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, a operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based data warehouse system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based data warehouse system 102. For example, data storage device 220 may represent caches in execution platform 114, storage devices in cloud computing storage platform 104, or any other storage device.

Figure 3:
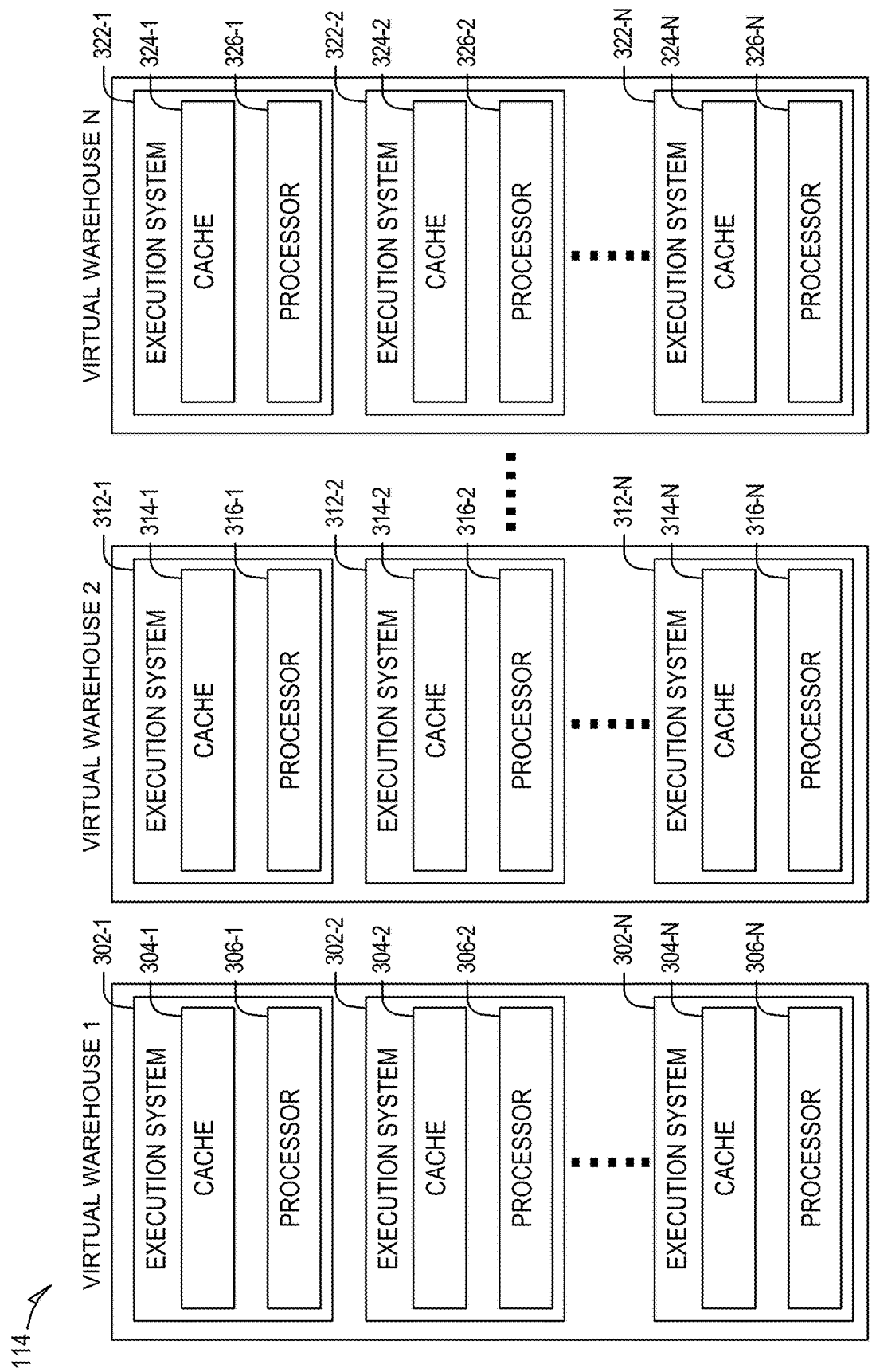
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-n shown in FIG. 1. Thus, the virtual warehouses are not necessarily assigned to a specific data storage device 124-1 to 124-n and, instead, can access data from any of the data storage devices 124-1 to 124-n within the cloud computing storage platform 104. Similarly, each of the execution nodes shown in FIG. 3 can access data from any of the data storage devices 124-1 to 124-n. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternate embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefor be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
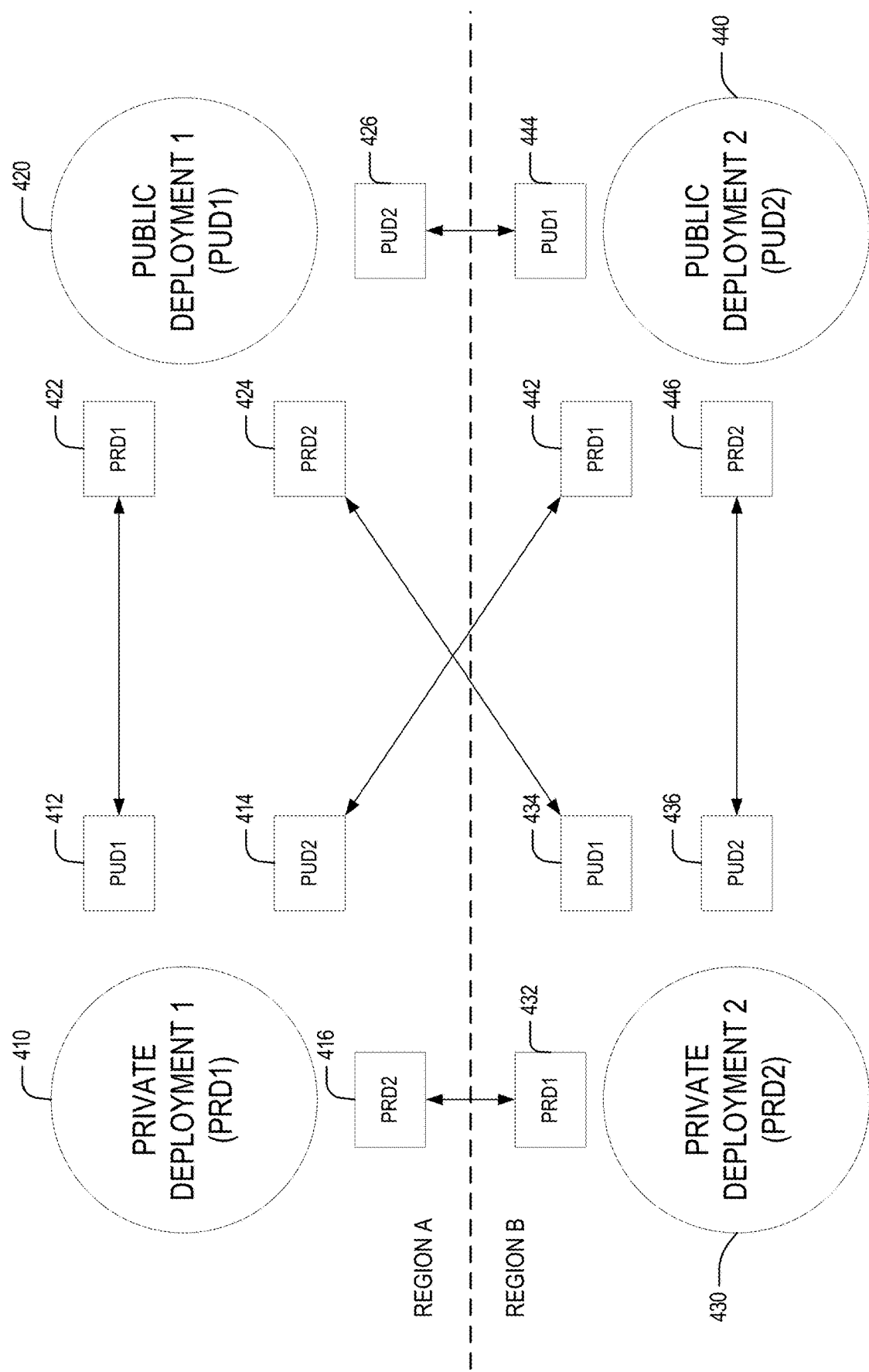
FIG. 4 is a block diagram illustrating a multiple deployment environment, according to some example embodiments.

FIG. 4 shows an example multiple deployment environment, according to some example embodiments. A deployment may include multiple components such as a metadata store, a front-end layer, a load balancing layer, a data warehouse, etc., as discussed above with respect to FIGS. 1-3. The multiple deployment environment may include a plurality of public and private deployments. A public deployment may be implemented as a multi-tenant environment, where each tenant or account shares processing and/or storage resources. For example, in a public deployment, multiple accounts may share a metadata store, a front-end layer, a load balancing layer, a data warehouse, etc. A private deployment, on the other hand, may be implemented as a dedicated, isolated environment, where processing and/or storage resources may be dedicated. Thus, private deployments may offer better security as well as better performance in some configurations.

In FIG. 4, a private deployment 1 (PRD1) 410 may be provided in cloud provider region A, and a public deployment 1 (PUD1) 420 may also be provided in cloud provider region A. A private deployment 2 (PRD2) 430 may be provided in another cloud provider region B, and a public deployment 2 (PUD2) 440 may also be provided in cloud provider region B. The cloud provider regions A and B may be different geographic regions, for example. In an embodiment, different cloud providers may operate the deployments in region A and/or region B.

In this example, the different deployments 410, 420, 430, 440 are configured to communicate with each other. For example, they can each send/receive messages to/from each other in a global messaging layer. To do so, each deployment may include deployment objects corresponding to the other communicatively coupled deployments, representing links to the target deployments. For example, PRD1 410 may include a PUD1 deployment object 412, a PUD2 deployment object 414, and a PRD2 deployment object 416. PUD1 420 may include a PRD1 deployment object 422, a PRD2 deployment object 424, and a PUD2 deployment object 426. PRD2 430 may include a PRD1 deployment object 432, a PUD1 deployment object 434, and a PUD2 deployment object 436. PUD2 440 may include a PRD1 deployment object 442, a PUD1 deployment object 444, and a PRD2 deployment object 446.

The deployments may store rules, which control the communication with other deployments, for example in their respective deployment objects. These rules enable controlling message traffic between different deployments. In some embodiments, the rules may be region-specific. For example, the rules may allow all messages between deployments in the same region group and may apply selective filtering to messages between deployments in a different region group. The rules may be provided as a policy relating to which messages to allow and which messages to block. In an embodiment, the rules or policy may be implemented at least in part using logic, for example in a messaging service.

Figure 5:
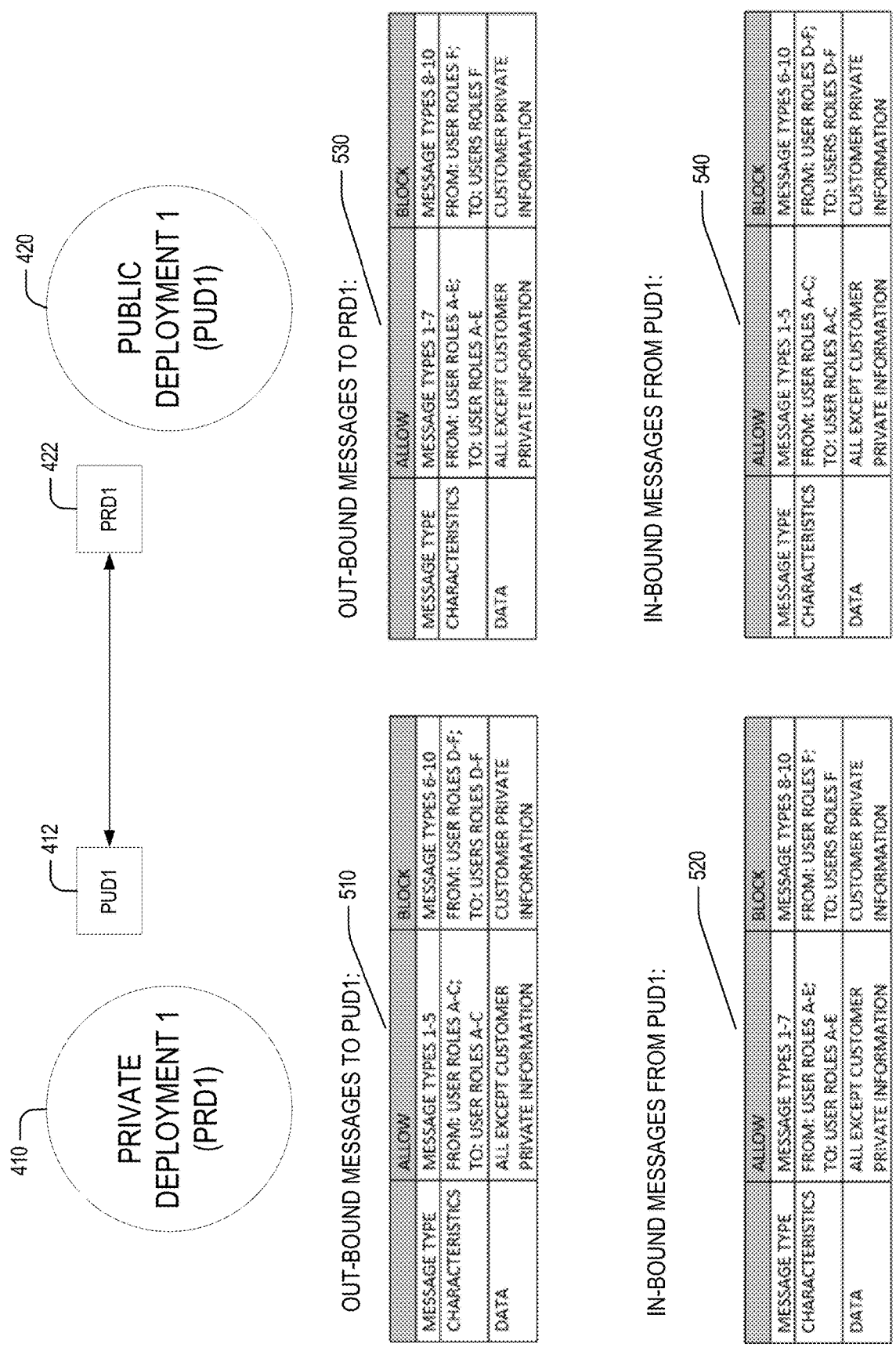
FIG. 5 illustrates example rule sets for governing communication between two deployments, according to some example embodiments.

FIG. 5 shows example rule sets for governing messaging traffic between two deployments, according to some example embodiments. Here, PRD1 410 may communicate with PUD1 420 by using PUD1 deployment object 412 in PRD1 410 and PRD1 deployment object 422 in PUD1 420.

Each deployment object, or deployment, may store rules for outgoing and incoming messages. For example, PUD1 deployment object 412 in PRD1 410 may store an outgoing rule set 510 for out-bound messages to PUD1 420 and an incoming rule set 520 for in-bound messages from PUD1 420. Likewise, PRD1 deployment object 422 in PUD1 420 may store an outgoing rule set 530 for out-bound messages to PRD1 410 and an incoming rule set 540 for in-bound messages from PRD1 410. The rule sets may indicate what messages are allowed to be communicated between the deployments and what messages are not allowed to be communicated between the deployments and should be blocked. As discussed above, in some embodiments, the rule sets may be based at least in part on the region(s) of the two deployments. For example, deployments in the same region group may have more relaxed rule sets, or none at all, as compared to deployments in different region groups, which may have more restricted rule sets. In some embodiments, an administrator may define and set the rule sets. In some embodiments, clients may define and set the rule sets for their deployments.

The rule sets may include multiple classifications used for filtering the messages, such as message type, characteristics, and data analysis. Message type corresponds to the type of message to be transmitted between the deployments. In some embodiments, a first set of message types may be blocked from transmission, while a second set of message types may be allowed. Different message types may include replication messages, ping messages, publish messages, etc. For example, in an embodiment, the following message types may be enabled to be communicated between two different deployments:

SNAPSHOT_PRIMARY
SNAPSHOT_DONE
SNAPSHOT_FAILED
SNAPSHOT_APPLIED
REFRESH_CANCELLED
PUBLISH_GLOBAL_OBJECT
PING
TEST_MESSAGE
GLOBAL_SET_UNSET_PARAMETER_REQUEST

Characteristics of a message relates to metadata about the message, but does not include the contents of the message itself. In some embodiments, a first set of characteristic types may be blocked from transmission, while a second set of characteristic types may be allowed. For example, identification and/or role of the sender, identification and/or role of the recipient, account ID of the sender or receiver, and direction of the message can be characteristics of a message.

Data analysis refers to the content of the message. The rule sets may allow certain data while blocking other data. For example, the rule sets, in some embodiments, may block sensitive customer information, such as customer private or personal data.

The rule sets may be configurable and may change over time. For example, the classification of message types may be configurable, such that a previously blocked message type may be changed to be allowed and vice versa. Also, new message types may be added to the system. In an embodiment, when a new message type is added, default values may control the classification of the new message type. For example, if a new message type is designated for internal use only, the default may be to add the new message type to the allowed list of message types. As another example, the default for a new message type may be to allow it for intra-region communication but block it for inter-region communication.

In some embodiments, the source and target deployments may implement a multi-stage filtering technique for outgoing and incoming messages based on the stored rule sets.

Figure 6:
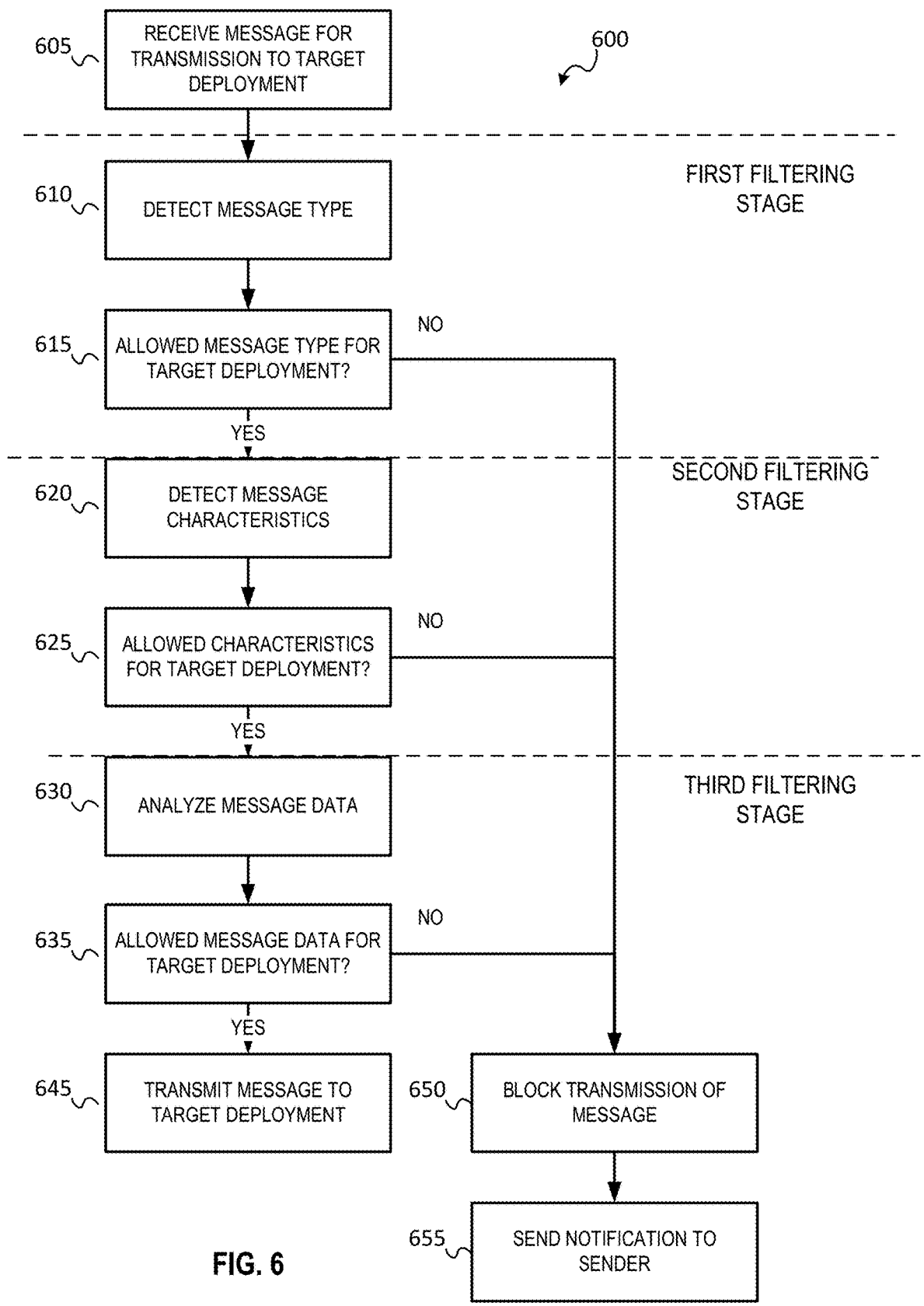
FIG. 6 shows a flow diagram for filtering outgoing messages, according to some example embodiments.

FIG. 6 shows a flow diagram of a method 600 at a source deployment for filtering outgoing messages to a target deployment, according to some example embodiments. The method 600 may be executed by a source deployment at a system level. In some embodiments, the method 600 may be executed by a deployment object residing in the source deployment corresponding to the target deployment, as discussed above.

At operation 605, the source deployment may receive or intercept a message that is meant for transmission to the target deployment. For example, the message may be sent by User A in the source deployment and addressed to User Z in the target deployment. The source deployment, or the deployment object in the source deployment, may store an outgoing message rule set for messages to be sent to the target deployment, for example, as discussed above with respect to FIG. 5. In an embodiment, the source and target deployment may be the same deployment.

At operation 610, in a first filtering stage, the source deployment may detect a message type of the outgoing message. The stored rule set may indicate which message types are allowed to be transmitted to the target deployment and which message types are not allowed to be transmitted to the target deployment.

At operation 615, the source deployment may compare the detected message type to the allowed and blocked message types in the rule set and may determine whether the detected message type is allowed to be transmitted to the target deployment. If the detected message type, based on the rule set, is a blocked message type, the source deployment, at operation 650, may block transmission of the message. At operation 655, the source deployment may send a notification to the sender and/or administrator of the message, alerting the sender and/or administrator of the blocked transmission.

If, however, at operation 615, the source deployment determines that the message is an allowed message type, the source deployment may pass the message to a second filtering stage. At operation 620, in a second filtering stage, the source deployment may detect one or more characteristics of the outgoing message. The stored rule set may indicate which message characteristics are allowed to be transmitted to the target deployment and which message characteristics are not allowed to be transmitted to the target deployment. Characteristics of a message relates to metadata about the message, but does not include the contents of the message itself. For example, identification and/or role of the sender, identification and/or role of the recipient, account ID of the sender or receiver, and direction of the message can be characteristics of a message.

At operation 625, the source deployment may compare the detected message characteristic(s) to the allowed and blocked message characteristics in the rule set and may determine whether the message based on the detected characteristic(s) is allowed to be transmitted to the target deployment. If the detected message characteristic(s), based on the rule set, are blocked characteristic(s), the source deployment, at operation 650, may block transmission of the message. At operation 655, the source deployment may send a notification to the sender and/or administrator of the message, alerting the sender and/or administrator of the blocked transmission.

If, however, at operation 625, the source deployment determines that the message includes allowed characteristic(s), the source deployment may pass the message to a third filtering stage. At operation 630, in a third filtering stage, the source deployment may analyze message content or data of the outgoing message. The stored rule set may indicate which message data is allowed to be transmitted to the target deployment and which message data is not allowed to be transmitted to the target deployment. For example, the rule set may indicate that sensitive customer information may not be transmitted to the source deployment.

At operation 635, the source deployment may compare the analyzed message content to the allowed and blocked message contents in the rule set and may determine whether the message based on the analyzed message content is allowed to be transmitted to the target deployment. If the analyzed message contents, based on the rule set, include blocked data, the source deployment, at operation 650, may block transmission of the message. At operation 655, the source deployment may send a notification to the sender and/or administrator of the message, alerting the sender and/or administrator of the blocked transmission.

If, however, at operation 635, the source deployment determines that the message content includes allowed data, the source deployment may pass the message on for transmission. At operation 645, the source deployment may transmit the message to the target deployment. For example, the source deployment may convert the message into a file and transmit the file to the target deployment.

Figure 7:
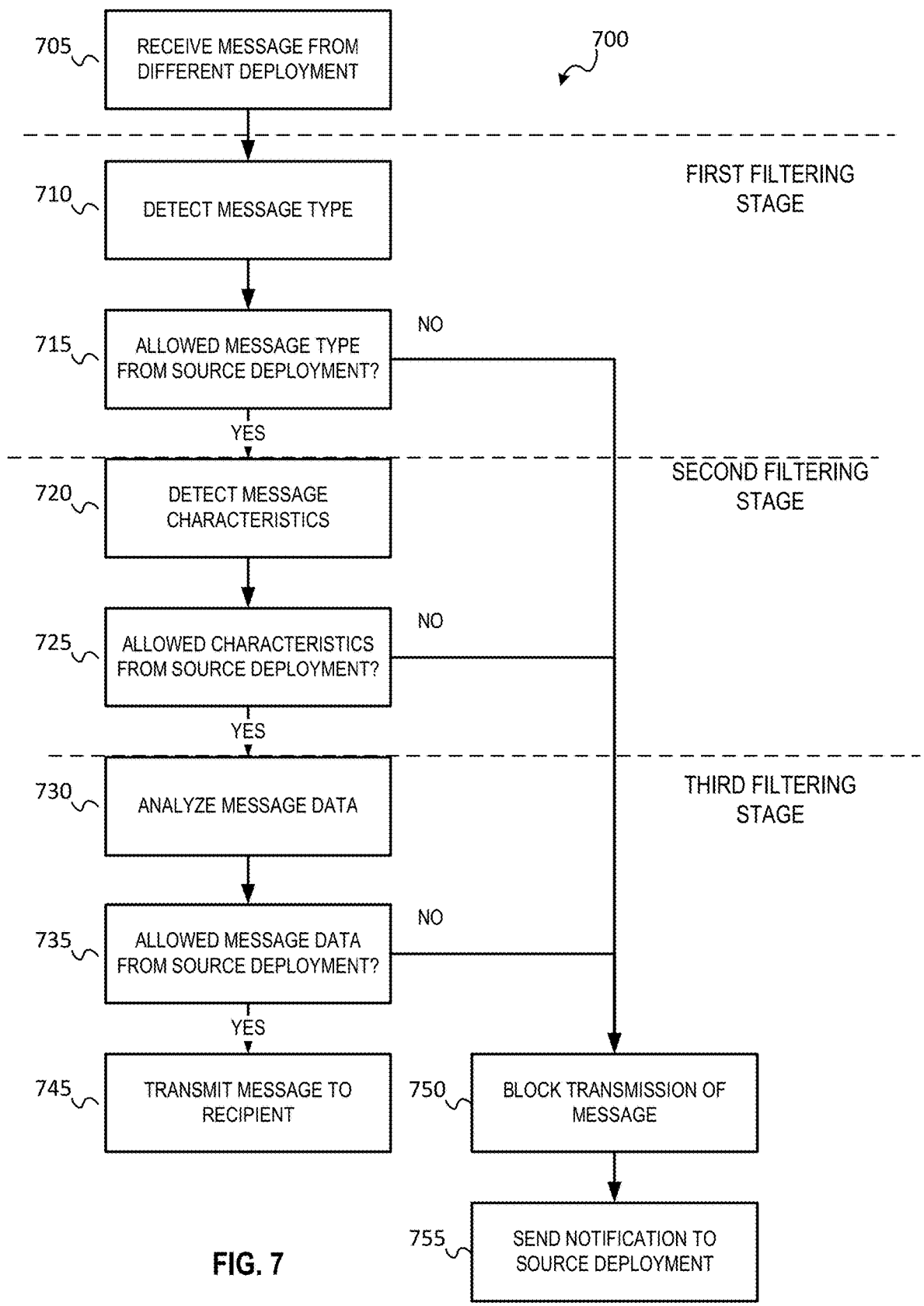
FIG. 7 shows a flow diagram for filtering incoming messages, according to some example embodiments.

In some embodiments, the target deployment, upon receiving the message from the source deployment, may implement its own multi-stage filtering technique before allowing the message to be sent to the recipient. This filtering technique at the target deployment adds another layer of protection, providing additional security benefits. FIG. 7 shows a flow diagram of a method 700 at a target deployment for filtering incoming messages from a source deployment, according to some example embodiments. The method 700 may be executed by a target deployment at a system level. In some embodiments, the method 700 may be executed by a deployment object residing in the target deployment corresponding to the source deployment, as discussed above.

At operation 705, the target deployment may receive or intercept a message that is meant for a recipient associated with the target deployment. The target deployment may receive a message file and convert or deserialize the message file, in some embodiments. For example, the message may be sent by User A in the source deployment and addressed to User Z in the target deployment, and the target deployment may intercept the message before it reaches User Z. The target deployment, or the deployment object in the source deployment, may store an incoming message rule set for messages to be received from the source deployment, for example, as discussed above with respect to FIG. 5. In some embodiments, the incoming message rule set at the target deployment may mirror the outgoing message rule set at the source deployment. Alternatively, in some embodiments, the incoming rule set at the target deployment may differ from the outgoing message rule set at the source deployment.

At operation 710, in a first filtering stage, the target deployment may detect a message type of the incoming message. The stored rule set may indicate which message types are allowed to be received from the source deployment and which message types are not allowed to be received from the source deployment.

At operation 715, the target deployment may compare the detected message type to the allowed and blocked message types in the rule set and may determine whether the detected message type is allowed to be received from the source deployment. If the detected message type, based on the rule set, is a blocked message type, the target deployment, at operation 750, may block the message. At operation 755, the target deployment may send a notification to the source deployment of the blocked transmission, and the source deployment in turn may send a notification to the sender and/or administrator, alerting the sender and/or administrator of the blocked transmission.

If, however, at operation 715, the target deployment determines that the message is an allowed message type, the target deployment may pass the message to a second filtering stage. At operation 720, in a second filtering stage, the target deployment may detect one or more characteristics of the outgoing message. The stored rule set may indicate which message characteristics are allowed to be received from the source deployment and which message characteristics are not allowed to be transmitted to the source deployment. Characteristics of a message relates to metadata about the message, but does not include the contents of the message itself. For example, identification and/or role of the sender, identification and/or role of the recipient, account ID of the sender or receiver, and direction of the message can be characteristics of a message.

At operation 725, the target deployment may compare the detected message characteristic(s) to the allowed and blocked message characteristics in the rule set and may determine whether the message based on the detected characteristic(s) is allowed to be received from the source deployment. If the detected message characteristic(s), based on the rule set, are blocked characteristic(s), the target deployment, at operation 650, may block the message. At operation 755, the target deployment may send a notification to the source deployment of the blocked transmission, and the source deployment in turn may send a notification to the sender and/or administrator, alerting the sender and/or administrator of the blocked transmission.

If, however, at operation 725, the target deployment determines that the message includes allowed characteristic(s), the target deployment may pass the message to a third filtering stage. At operation 730, in a third filtering stage, the target deployment may analyze message content or data of the incoming message. The stored rule set may indicate which message data is allowed to be received from the source deployment and which message data is not allowed to be received from the source deployment. For example, the rule set may indicate that sensitive customer information may not be received from the source deployment.

At operation 735, the target deployment may compare the analyzed message content to the allowed and blocked message contents in the rule set and may determine whether the message based on the analyzed message content is allowed to be received from the source deployment. If the analyzed message contents, based on the rule set, include blocked data, the target deployment, at operation 650, may block the message. At operation 755, the target deployment may send a notification to the source deployment of the blocked transmission, and the source deployment in turn may send a notification to the sender and/or administrator, alerting the sender and/or administrator of the blocked transmission.

If, however, at operation 735, the target deployment determines that the message content includes allowed data, the target deployment may pass the message on for transmission. At operation 745, the target deployment may transmit the message to the recipient.

The filtering techniques described herein may appear transparent to the sender and recipient of the message. Only if the message is blocked by one of the filtering stages, either at the source or target deployment, would the effects of the filtering technique be felt by the users. And even then, the sending user and/or administrator may be notified of the blocked transmission. Without the notification, a request, such as a replication request, may be left in a hung state, which is undesirable. In some embodiments, the filtering techniques described herein may enable replication between private and public deployments while maintaining control and security safeguards. For example, using the selective filtering techniques described herein, messages may be exchanged between different deployments to replicate data using the techniques described in U.S. patent application Ser. No. 16/392,258, entitled "Data Replication and Data Failover in Database Systems," filed on Apr. 23, 2019.

In some instances, a deployment may become compromised because of, for example, a security breach, hardware malfunction, etc. In these instances, other deployments may want to cease all communication with the compromised deployment for security purposes.

Figure 8:
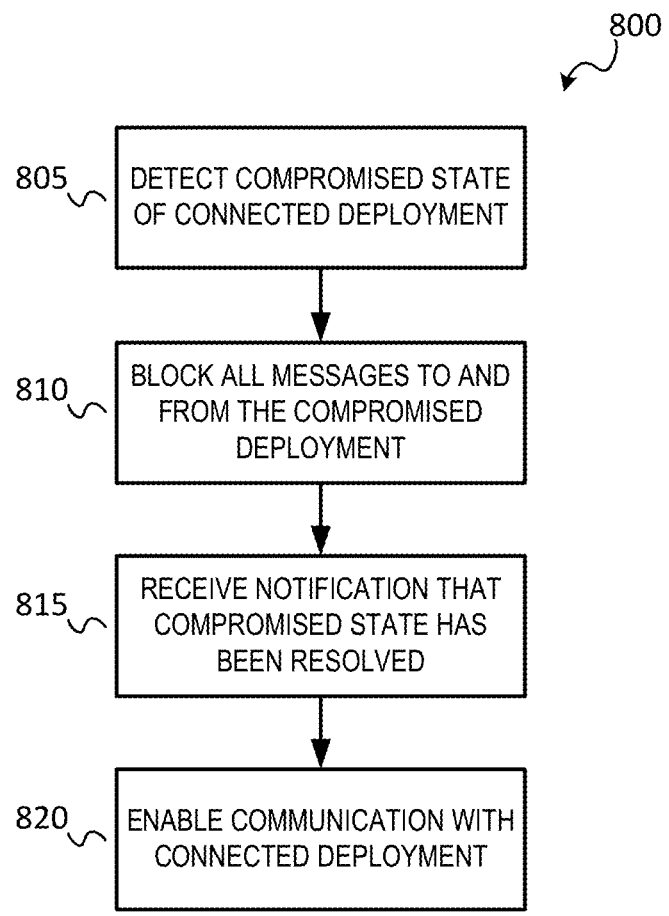
FIG. 8 shows a flow diagram for controlling communication between two deployments, according to some example embodiments.

FIG. 8 shows a flow diagram of a method 800 at a deployment for controlling communication with another deployment, which may be compromised, according to some example embodiments. The method 800 may be executed by a deployment at a system level. In some embodiments, the method 800 may be executed by a deployment object residing in the deployment corresponding to the other deployment, as discussed above.

At operation 805, the deployment may detect that the connected deployment has been compromised. For example, the deployment may receive a message indicating that the connected deployment has been compromised. In another embodiment, an administrator may notify the deployment that the connected deployment has been compromised.

At operation 810, in response to detecting that the connected deployment has been compromised, the deployment may disable all communication with the compromised deployment by blocking all incoming and outgoing messages to and from the compromised deployment. The deployment may block all messages until it receives notification that the connected deployment is no longer compromised, at operation 815. Consequently, at operation 820, the deployment may re-enable communication with the connected deployment based on the rule sets controlling communication between the two deployments as discussed above.

Figure 9:
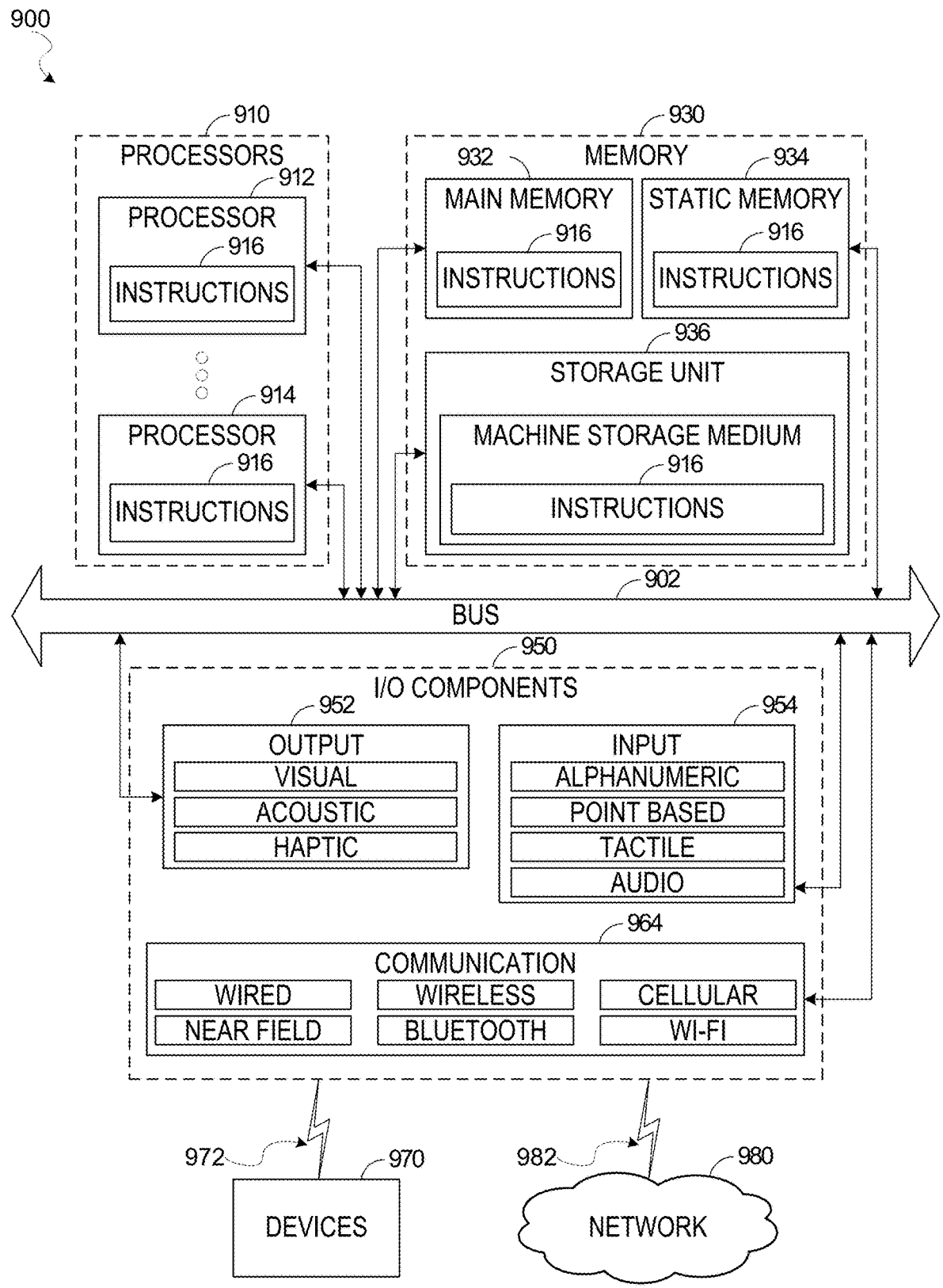
FIG. 9 illustrates a diagrammatic representation of a machine in the form of a computer system within which a set of instructions may be executed for causing the machine to perform any one or more of the methodologies discussed herein, in accordance with some embodiments of the present disclosure.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute any one or more operations of any one or more of the methods 600, 700, and 800. As another example, the instructions 916 may cause the machine 900 to implemented portions of the data flows illustrated in any one or more of FIGS. 1-8. In this way, the instructions 916 transform a general, non-programmed machine into a particular machine 900 (e.g., the remote computing device 106, the access management system 110, the compute service manager 112, the execution platform 114, the access management system 118, the Web proxy 120, remote computing device 106) that is specially configured to carry out any one of the described and illustrated functions in the manner described herein.

In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 includes processors 910, memory 930, and input/output (I/O) components 950 configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, all accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 include components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, and other communication components to provide communication via other modalities. The devices 970 may be another machine or any of a wide variety of peripheral devices (e.g., a peripheral device coupled via a universal serial bus (USB)). For example, as noted above, the machine 900 may correspond to any one of the remote computing device 106, the access management system 110, the compute service manager 112, the execution platform 114, the access management system 118, the Web proxy 120, and the devices 970 may include any other of these systems and devices.

The various memories (e.g., 930, 932, 934, and/or memory of the processor(s) 910 and/or the storage unit 936) may store one or more sets of instructions 916 and data structures (e.g., software) embodying or utilized by any one or more of the methodologies or functions described herein. These instructions 916, when executed by the processor(s) 910, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods 600, 700, and 800 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

The following numbered examples are embodiments:

Example 1. A method, comprising: receiving, by one or more processors of a first deployment, a message from a first computing device in the first deployment to be transmitted to a recipient in a second deployment; in a first filtering stage, detecting a message type of the message; based on the detected message type belonging to a first set of message types, blocking transmission of the message to the second deployment; based on the detected message type belonging to a second set of message types, passing the message to a second filtering step; in the second filtering stage, detecting a characteristic of the message; based on the detected characteristic belonging to a first set of characteristic types, blocking transmission of the message to the second deployment; based on the detected message type belonging to a second set of characteristic types, transmitting the message from the first deployment to the second deployment.

Example 2. The method of example 1, further comprising: a third filtering stage before allowing transmission of the message, wherein the third filtering step comprises performing an analysis of data in the message; based on the analysis of the data in the message, determining whether to block or allow transmission of the message to the second deployment.

Example 3. The method of any of examples 1-2, wherein the second deployment employs a filtering scheme before the message reaches the recipient in the second deployment.

Example 4. The method of any of examples 1-3, further comprising: receiving notification from the second deployment that the message was blocked from reaching the recipient.

Example 5. The method of any of examples 1-4, wherein the first deployment is a private deployment and the second deployment is a public deployment.

Example 6. The method of any of examples 1-5, further comprising: detecting that the second deployment has been compromised; and based on detecting that the second deployment has been compromised, blocking transmission of the message to the second deployment.

Example 7. The method of any of examples 1-6, further comprising: based on detecting that the second deployment has been compromised, blocking reception of any messages at the first deployment from the second deployment.

Example 8. The method of any of examples 1-7, further comprising: sending notification of the blocked transmission to the first computing device.

Example 9. The method of any of examples 1-8, wherein the characteristic of the message includes one or more of: identity of sender, identity of recipient, and direction of the message.

Example 10. A system comprising: one or more processors of a machine; and a memory storing instructions that, when executed by the one or more processors, cause the machine to perform operations implementing any one of example methods 1 to 9.

Example 11. A machine-readable storage device embodying instructions that, when executed by a machine, cause the machine to perform operations implementing any one of example methods 1 to 9.

What is claimed is:

1. A method, comprising:
   receiving, by one or more processors of a first deployment, a message from a first computing device in the first deployment to be transmitted to a recipient in a second deployment, the first and second deployments being different types of deployments, wherein the first deployment is a private data-system deployment where processing and storage resources are dedicated to a single tenant and the second deployment is public data-system deployment where processing and storage resources are shared by multiple tenants;
   detecting a message type of the message using a filter based on an outbound rule set defined for the second deployment, the message type defining a data operation to be performed on stored data associated with the first deployments;
   based on the detected message type belonging to a first set of message types, blocking transmission of the message to the second deployment;
   based on the detected message type belonging to a second set of message types, proceeding in transmitting the message from the first deployment to the second deployment, the second deployment being configured to execute the data operation on the stored data associated with the first deployment in response to receiving the message;
   detecting that the second deployment has been compromised; and
   based on detecting that the second deployment has been compromised, blocking transmission of the message to the second deployment.

2. The method of claim 1, further comprising:
   detecting a characteristic of the message;
   based on the detected characteristic belonging to a first set of characteristic types, blocking transmission of the message to the second deployment;
   based on the detected characteristic belonging to a second set of characteristic types, proceeding in transmitting the message from the first deployment to the second deployment.

3. The method of claim 2, wherein the characteristic of the message includes one or more of: identity of sender, identity of recipient, and direction of the message.

4. The method of claim 1, further comprising:
   performing an analysis of data in the message; and
   based on the analysis of the data in the message, determining whether to block or allow transmission of the message to the second deployment.

5. The method of claim 1, wherein the second deployment employs a filtering scheme before the message reaches the recipient in the second deployment.

6. The method of claim 5, further comprising:
   receiving notification from the second deployment that the message was blocked from reaching the recipient.

7. The method of claim 1, further comprising:
   based on detecting that the second deployment has been compromised, blocking reception of any messages at the first deployment from the second deployment.

8. A system comprising:
   one or more processors of a machine; and
   at least one memory storing instructions that, when executed by the one or more processors, cause the machine to perform operations comprising:
   receiving, by one or more processors of a first deployment, a message from a first computing device in the first deployment to be transmitted to a recipient in a second deployment, the first and second deployments being different types of deployments, wherein the first deployment is a private data-system deployment where processing and storage resources are dedicated to a single tenant and the second deployment is public data-system deployment where processing and storage resources are shared by multiple tenants;
   detecting a message type of the message using a filter based on an outbound rule set defined for the second deployment, the message type defining a data operation to be performed on stored data associated with the first deployments;
   based on the detected message type belonging to a first set of message types, blocking transmission of the message to the second deployment;
   based on the detected message type belonging to a second set of message types, proceeding in transmitting the message from the first deployment to the second deployment, the second deployment being configured to execute the data operation on the stored data associated with the first deployment in response to receiving the message;
   detecting that the second deployment has been compromised; and
   based on detecting that the second deployment has been compromised, blocking transmission of the message to the second deployment.

9. The system of claim 8, the operations further comprising:
  detecting a characteristic of the message;
  based on the detected characteristic belonging to a first set of characteristic types, blocking transmission of the message to the second deployment;
  based on the detected characteristic belonging to a second set of characteristic types, proceeding in transmitting the message from the first deployment to the second deployment.

10. The system of claim 9, wherein the characteristic of the message includes one or more of: identity of sender, identity of recipient, and direction of the message.

11. The system of claim 8, the operations further comprising:
  performing an analysis of data in the message; and
  based on the analysis of the data in the message, determining whether to block or allow transmission of the message to the second deployment.

12. The system of claim 8, wherein the second deployment employs a filtering scheme before the message reaches the recipient in the second deployment.

13. The system of claim 12, the operations further comprising:
  receiving notification from the second deployment that the message was blocked from reaching the recipient.

14. The system of claim 8, the operations further comprising:
  based on detecting that the second deployment has been compromised, blocking reception of any messages at the first deployment from the second deployment.

15. A machine-storage medium embodying instructions that, when executed by a machine, cause the machine to perform operations comprising:
  receiving, by one or more processors of a first deployment, a message from a first computing device in the first deployment to be transmitted to a recipient in a second deployment, the first and second deployments being different types of deployments, wherein the first deployment is a private data-system deployment where processing and storage resources are dedicated to a single tenant and the second deployment is public data-system deployment where processing and storage resources are shared by multiple tenants;
  detecting a message type of the message using a filter based on an outbound rule set defined for the second deployment, the message type defining a data operation to be performed on stored data associated with the first deployments;
  based on the detected message type belonging to a first set of message types, blocking transmission of the message to the second deployment;
  based on the detected message type belonging to a second set of message types, proceeding in transmitting the message from the first deployment to the second deployment, the second deployment being configured to execute the data operation on the stored data associated with the first deployment in response to receiving the message;
  detecting that the second deployment has been compromised; and
  based on detecting that the second deployment has been compromised, blocking transmission of the message to the second deployment.

16. The machine-storage medium of claim 15, further comprising:
  detecting a characteristic of the message;
  based on the detected characteristic belonging to a first set of characteristic types, blocking transmission of the message to the second deployment;
  based on the detected characteristic belonging to a second set of characteristic types, proceeding in transmitting the message from the first deployment to the second deployment.

17. The machine-storage medium of claim 15, further comprising:
  performing an analysis of data in the message; and
  based on the analysis of the data in the message, determining whether to block or allow transmission of the message to the second deployment.

18. The machine-storage medium of claim 15, wherein the second deployment employs a filtering scheme before the message reaches the recipient in the second deployment.

19. The machine-storage medium of claim 15, further comprising:
  based on detecting that the second deployment has been compromised, blocking reception of any messages at the first deployment from the second deployment.

* * * * *